Patented July 25, 1933

1,919,886

UNITED STATES PATENT OFFICE

WILLY O. HERRMANN AND ERICH BAUM, OF MUNICH, GERMANY, ASSIGNORS TO CONSORTIUM FUR ELEKTROCHEMISCHE INDUSTRIE, G. M. B. H., OF MUNICH, GERMANY

PROCESS FOR ADDING HYDROGEN HALIDE TO ACETYLENE

No Drawing. Application filed November 4, 1929, Serial No. 404,862, and in Germany November 19, 1928.

By a known process hydrogen halide is added to acetylene by passing both components over mercury compounds as catalyst. The efficiency of the catalyst decreases in a short time, the mercury compound subliming from the carrier.

Now we have found that catalysts having longer life may be formed by using as a carrier, substances with a high surface action, such as highly active carbon or silica gel.

We have further found that the lifetime and efficiency of the catalyst is still increased if instead of mercury compounds, the halides of other elements of the second group of the periodic system and also of the fifth group are used, as for instance the chlorides of magnesium, calcium, strontium, barium, zinc, vanadium, antimony, bismuth. Mixtures of these catalysts may also be used. The reaction may be carried out at temperatures between 120° and 300° C. The reaction mixture is conducted over the catalyst at a velocity per hour of more than 50 liters per liter of the catalyst.

Example I

Highly active carbon is impregnated with a solution of bismuth chloride in hydrochloric acid. The catalyzer is dried in a stream of hydrochloric-acid gas. At a temperature of about 200° C., equal volumes of acetylene and dry hydrochloric acid gas are led over the catalyst. There may be passed over the catalyst a multiple quantity of the amount of gases reacting to form vinyl chloride. More than 100 grams of vinyl chloride, besides 8-10 grams of ethylidene chloride are formed per hour and liter of the catalyst. After a running of the process for 100 hours, the efficiency of the catalyst was still unchanged.

Example II

Silica gel is impregnated with a solution of antimony chloride in hydrochloric acid. The process is carried out according to Example I at a temperature up to about 180° C. There is no formation of ethylidene chloride but only of vinyl chloride.

Example III

Highly active carbon is impregnated with a solution of barium chloride and dried in a stream of hydrochloric acid gas. The process is carried out at a temperature of about 200° to about 250° C. as in Example I, the efficiency answering to this example. Only small quantities of ethylidene chloride are formed.

Example IV

Highly active carbon is impregnated with a solution of barium bromide and dried in a stream of hydrogen bromide. By passing over the catalyst a stream of acetylene and hydrogen bromide, a good yield of vinyl bromide is obtained, ethylidene bromide being formed as a byproduct.

Example V

A porcelain tube of 160 cm length and 4.3 cm diameter is filled with 2,100 cubic centimeters of highly activated carbon impregnated with 10 percent of its weight of barium chloride. The catalyst is heated to 250-260° C. and about 800 liters of acetylene per hour are circulated over it by a pump, 200 grams of hydrochloric acid gas being simultaneously led thru the apparatus. The unconsumed hydrochloric acid is absorbed by washing with water and the vinyl chloride formed is condensed by cooling. The unconsumed acetylene is led back into the apparatus by means of the pump. About 100 grams of vinyl chloride are obtained per hour.

What we claim is:

1. Process for adding a hydrogen halide to acetylene comprising passing at atmospheric pressure a mixture of acetylene and a hydrogen halide over a metal halide catalyst of the second group of the periodic system up to and including an atomic weight of 137.4 and of the fifth group of the periodic system at a temperature between 120 to 300° C., using as a carrier for the catalyst substances of high surface action.

2. Process for adding a hydrogen halide to acetylene comprising passing at atmospheric pressure a mixture of acetylene and a hydrogen halide over metal halide catalysts of the second group of the periodic system up to and including an atomic weight of 137.4 and of the fifth group of the periodic system at a temperature between 120 to 300° C., using as a carrier for the catalyst substances of high surface action.

3. Process for adding a hydrogen halide to acetylene comprising passing at atmospheric pressure a multiple quantity of the amount of gases reacting to form a vinylhalide over metal halide catalysts of the second group of the periodic system up to and including an atomic weight of 137.4 and of the fifth group of the periodic system at a temperature between 120 to 300° C., using as a carrier for the catalyst substances of high surface action, and leading back the unconverted reactants into the reaction apparatus.

4. Process for adding a hydrogen halide to acetylene comprising passing at atmospheric pressure a mixture of acetylene and a hydrogen halide over metal halide catalysts of the second group of the periodic system up to and including an atomic weight of 137.4 and of the fifth group of the periodic system at a temperature between 120 to 300° C. and at a velocity per hour of more than 50 liters per liter of the catalyst, using as a carrier for the catalyst substances of high surface action.

5. Process for adding a hydrogen halide to acetylene comprising passing at atmospheric pressure a mixture of acetylene and a hydrogen halide over metal halide catalysts of the second group of the periodic system up to and including an atomic weight of 137.4 and of the fifth group of the periodic system at a temperature between 120 to 300° C, and at a velocity per hour of more than 50 liters per liter of the catalyst, using as a carrier for the catalyst substances of high surface action, and recirculating the unconverted reactants.

6. Process for adding a hydrogen halide to acetylene comprising passing at atmospheric pressure a mixture of acetylene and a hydrogen halide over metal halide catalysts of the second group of the periodic system up to and including an atomic weight of 137.4 and of the fifth group of the periodic system at a temperature between 120 to 300° C. and at a velocity per hour of more than 50 liters per liter of the catalyst, using as a carrier for the catalyst substances of high surface action, absorbing the unconverted hydrogen halide by water and returning the unconverted acetylene to the reaction apparatus.

7. Process for producing vinyl chloride comprising passing at atmospheric pressure a mixture of acetylene and hydrogen chloride over highly active carbon impregnated with barium chloride at a temperature of 120 to 300° C. and at a velocity per hour of more than 50 liters per liter of the catalyst.

8. Process for producing vinyl chloride comprising passing at atmospheric pressure a mixture of acetylene and hydrogen chloride over highly active carbon impregnated with barium chloride at a temperature of 120 to 300° C. and at a velocity per hour of more than 50 liters per liter of the catalyst, and recirculating the unconverted reactants.

9. Process of producing vinyl chloride comprising passing at atmospheric pressure a mixture of acetylene and hydrogen chloride over highly active carbon impregnated with barium chloride at a temperature of 120 to 300° C. and at a velocity per hour of more than 50 liters per liter of the catalyst, absorbing the unconverted hydrogen chloride by water and returning the unconverted acetylene to the reaction apparatus.

10. Process for producing vinyl chloride comprising passing at atmospheric pressure a multiple quantity of the gases reacting to form vinyl chloride over highly active carbon impregnated with barium chloride at a temperature of 220 to 250° C. and at a velocity per hour of more than 50 liters per liter of the catalyst, and recirculating the unconverted reactants.

WILLY O. HERRMANN.
ERICH BAUM.